US005652571A

United States Patent [19]

Shima et al.

[11] Patent Number: 5,652,571

[45] Date of Patent: Jul. 29, 1997

[54] RADIO PAGING RECEIVER FOR ANNOUNCING AN UNCONFIRMED MESSAGE FULL STATE OF A MESSAGE MEMORY

[75] Inventors: Makoto Shima, Tokyo; Jun Uchida, Shizuoka, both of Japan

[73] Assignee: NEC Corporation, Tokyo, Japan

[21] Appl. No.: 292,009

[22] Filed: Aug. 17, 1994

[30] Foreign Application Priority Data

Aug. 17, 1993 [JP] Japan .................................... 5-203158

[51] Int. Cl.$^{6}$ .................................................... H04Q 1/00

[52] U.S. Cl. ..................................... 340/825.44; 455/38.1

[58] Field of Search ......................... 340/825.44, 825.48; 455/38.1, 38.2, 38.5

[56] References Cited

U.S. PATENT DOCUMENTS

| | | | |
|---|---|---|---|
| 4,851,829 | 7/1989 | DeLuca et al. | 340/825.44 |
| 4,975,694 | 12/1990 | McLaughlin | 340/825.44 |
| 5,332,994 | 7/1994 | Kasashima | 340/825.44 |
| 5,394,140 | 2/1995 | Wong | 340/825.44 |

FOREIGN PATENT DOCUMENTS

| | | |
|---|---|---|
| 0261417 | 3/1988 | European Pat. Off. . |
| 292243 | 7/1990 | Japan . |
| 2116342 | 9/1983 | United Kingdom . |

*Primary Examiner*—Brian Zimmerman

*Attorney, Agent, or Firm*—Sughrue, Mion, Zinn, Macpeak & Seas

[57] ABSTRACT

In a radio paging receiver in which a CPU (6) stores a received message in one of message areas of a message memory (8) as an unconfirmed message and in which an announcing section (11–18) carries out a call announcement in response to the received message, the CPU makes the announcing section announce an unconfirmed message full announcement instead of the call announcement when each message area is filled with the unconfirmed message and when an announcement stop instruction is not received from a keyboard (10) within a predetermined time interval from a time instant at which the call announcement is started. The unconfirmed message full announcement has an announcing pattern which is different from that of the call announcement. When the instruction is received within the predetermined time interval, the CPU makes the announcing section stop the call announcement and makes the message memory memorize the received message in the above-mentioned one of the message areas as a confirmed message instead of the unconfirmed message.

10 Claims, 5 Drawing Sheets

RADIO PAGING RECEIVER FOR ANNOUNCING AN UNCONFIRMED MESSAGE FULL STATE OF A MESSAGE MEMORY

BACKGROUND OF THE INVENTION

This invention relates to a radio paging receiver and, in particular, to a radio paging receiving having a message display function.

One of conventional radio paging receivers of the type described is disclosed in Japanese Utility Model Prepublication No. 92243/1990 (Title of Invention: Paging Receiver with Message Receiving Function). The radio paging receiver disclosed therein has a function of protecting unconfirmed messages memorized in a first or main memory area of a message memory of, for example, an RAM (random access memory) until a possessor of the radio paging receiver confirms the unconfirmed message under consideration. The unconfirmed message is a message which is not yet confirmed by the possessor. For this purpose, the radio paging receiver comprises in the message memory, in addition to the first memory area for successively memorizing a plurality of received messages, a second or subsidiary memory area for memorizing an oldest reception unconfirmed message among the unconfirmed messages that is erased from the first memory area. When the oldest reception unconfirmed message is transferred from the first memory area to the second memory area and is thereby memorized in the second memory area, this is announced for a predetermined time interval.

In the above-mentioned conventional radio paging receiver, the reception message must be transferred from the first memory area to the second memory area when the first memory area has no vacant or empty area (that is, the first memory area is put in a full state in which the first memory area is filled with the reception messages), in order to prevent erasure of any unconfirmed message before it is confirmed. Necessity of the second memory area and a transfer function of the reception message from the first memory area to the second memory area results in a complicated structure and an increased cost of the radio paging receiver.

In the above-mentioned radio paging receiver, a confirmed message may possibly be erased even if it is protected as a protected message (with a protected attribute).

SUMMARY OF THE INVENTION

It is therefore an object of this invention to remove the disadvantages of the conventional radio paging receiver and to provide a radio paging receiver of a simple structure which can assure that any unconfirmed message before confirmed by a possessor is never overwritten or updated by a newly-received message.

It is another object of this invention to provide a radio paging receiver of the type described, which can acknowledge that a message memory is filled with unconfirmed messages except protected messages.

Other objects of this invention will become clear as the description proceeds.

According to this invention, there is provided a radio paging receiver comprising: receiving means for receiving a radio signal comprising a message and destined to the receiver and for producing the message as a received message; a message memory having a plurality of message areas; storing means for storing the received message in one of the message areas as an unconfirmed message; announcing means for carrying out a call announcement in response to the received message to announce reception of the received message; instruction producing means for producing an announcement stop instruction; first detecting means connected to the announcing means and the instruction producing means for detecting whether or not the announcement stop instruction is received within a predetermined time interval from a first time instant at which the announcing means begins to carry out the call announcement; first control means connected to the announcing means and the first detecting means for controlling, when the first detecting means detects that the announcement stop instruction is received within the predetermined time interval, the announcing means and the message memory so that the announcing means stops the call announcement and that the message memory memorizes the received message in the one of the message areas as a confirmed message instead of the unconfirmed message; second detecting means connected to the message memory and the first detecting means for detecting that each of the message areas is filled with the unconfirmed message when the first detecting means does not detect that the announcing stop instruction is received within the predetermined time interval; and second control means connected to the announcing means and the second detecting means for controlling, when the second detecting means detects that each of the message areas is filled with the unconfirmed message, the announcing means to make the announcing means announce an unconfirmed message full announcement instead of the call announcement. The unconfirmed message full announcement has a different announcing pattern which is different from that of the call announcement.

DESCRIPTION OF PREFERRED EMBODIMENT

Figure 1:
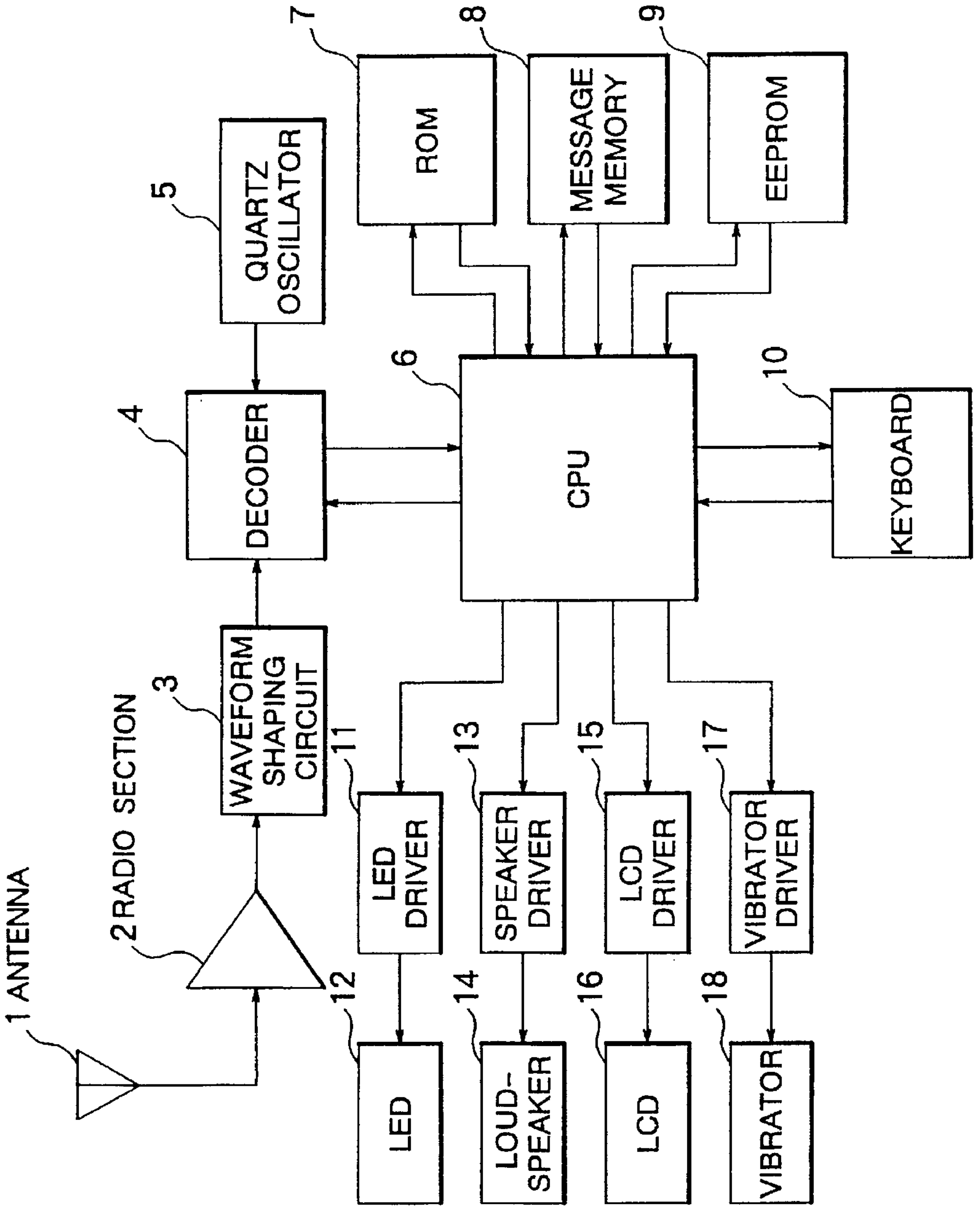
FIG. 1 is a block diagram of a radio paging receiver according to an embodiment of this invention.

Referring to FIG. 1, a radio paging receiver according to a preferred embodiment of this invention has a display function. A radio signal is received by an antenna 1 to be amplified and demodulated in a radio section 2. A demodulated signal demodulated by the radio section 2 is converted by a waveform shaping circuit 3 into a converted signal having a waveform so that a decoder 4 can deal with the converted signal. The decoder 4 takes in the converted signal in synchronism with a succession of reference clocks generated by a quartz oscillator 5. A CPU (central processing unit) 6 compares a call number in the demodulated signal with an address number assigned to the receiver and preliminarily memorized in an EEPROM (electrically erasable programmable read-only memory) 9. When coincidence between the call number and the address number is confirmed, the CPU 6 further takes in a received message which follows the call number in the converted signal. A call announcing operation is then started.

In the call announcing operation, the CPU 6 at first makes the received message be stored in one of message areas (FIG. 2) of a message memory 8 of, for example, an RAM in the manner which will later be described. In this event, in response to a control signal received from the ROM 7 in which an operation program is installed, the CPU 6 checks a storage condition of the message areas of the message memory 8 and classifies the contents of the message areas of the message memory 8 into protected messages, confirmed messages, and unconfirmed messages. Detecting that the message memory 8 is entirely filled with the messages (namely, the message memory 8 is in a message full condition) and that all messages except the protected messages are the unconfirmed messages, the CPU 6 sets an unconfirmed message full flag in an unconfirmed message flag area 81 (FIG. 2) of the message memory 8.

Figure 2:
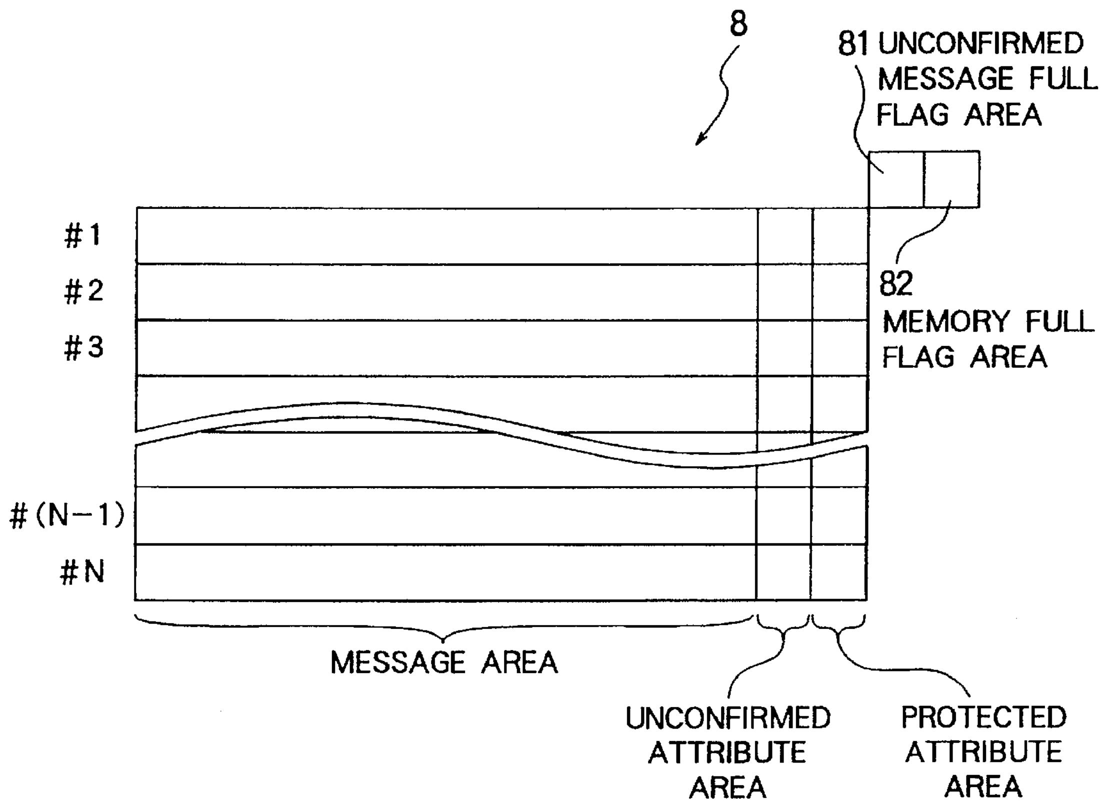
FIG. 2 is a diagram for use in describing operation of a message memory of the radio paging receiver illustrated in FIG. 1.

In FIG. 2, each of the protected messages is memorized in the message area with a protected attribute set in a protected attribute area corresponding to the message area in question. Each of the unconfirmed messages is memorized in the message area with an unconfirmed attribute set in an unconfirmed attribute area corresponding to the message area under consideration. Each of the confirmed messages is memorized in the message area with the unconfirmed attribute removed from the unconfirmed attribute area corresponding to the message area in question.

In FIG. 1, after classifying the contents of the message areas of the message memory 8, the CPU 6 controls an LED driver or driving circuit 11 to make an LED (light emitting diode) 12 start intermittent emission of light. Simultaneously, the CPU 6 controls a loudspeaker driver or driving circuit 13 to make a loudspeaker 14 start generation of an audible tone. Alternatively, the CPU 6 controls a vibrator driver or driving circuit 17 to start vibration by a vibrator 18. In addition, the radio paging receiver has a display function. Simultaneously with a call announcement carried out by the LED 12, the loudspeaker 14, and the vibrator 18, the CPU 6 controls an LCD driver or driving circuit 15 to make an LCD (liquid crystal display panel) 16 display the received message. Thus, the call announcement is also carried out by LCD display.

Detecting that the unconfirmed message full flag is set in the unconfirmed message full flag area 81 (FIG. 2) of the message memory 8 after the call announcement is carried out, the CPU 6 makes each of the LED 12, the loudspeaker 14, the LCD 16, and the vibrator 18 carry out, after the call announcement, an unconfirmed message full announcement of a different announcing pattern different from that of the call announcement.

When a keyboard 10 is operated during the call announcement to input a stop instruction into the CPU 6 for the purpose of message confirmation, the CPU 6 stops the call announcing operation and simultaneously removes the unconfirmed attribute for the received message from the message memory 8. The received message in the message memory 8 is thereby changed into the confirmed message. In addition, the unconfirmed message full flag is removed from the unconfirmed message full flag area 81 (FIG. 2) of the message memory 8.

Thereafter, when the message confirming operation is carried out by the use of the keyboard 10 for another received message, the CPU 6 takes in the received message from the message memory 8 and drives the LCD driver 15 to make the LCD 16 display the received message. At this time, the CPU 6 removes the unconfirmed attribute and the unconfirmed message full flag from the message memory 8.

When a protecting operation is carried out to input a protection instruction into the CPU 6 by the use of the keyboard 10, the CPU 6 imparts the protected attribute to a particular message among the messages stored in the message memory 8 that is designated by the protection instruction. Such message is protected as a protected message which is not automatically erased from the message memory 8.

On the other hand, when an erasing operation is carried out to input an erasing instruction into the CPU 6 by the use of the keyboard 10, the CPU 6 erases the messages from the message memory 8 in a reception order in which the messages are received.

Figure 3:
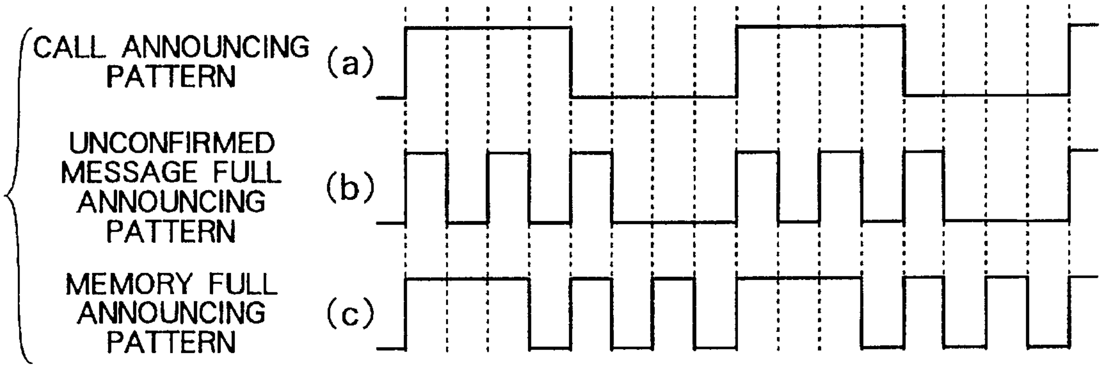
FIG. 3 is a time chart for use in describing announcing operation of the radio paging receiver illustrated in FIG. 1.

Turning to FIG. 3, description will be made as regards announcing patterns in the radio paging receiver of FIG. 1.

A call announcing pattern (a) for the call announcement has an announcement state of a time interval of four times a unit time and an announcement interruption state of the time interval of four times the unit time. The announcement state and the announcement interruption state periodically appears in the call announcing pattern at a period of eight times the unit time.

On the other hand, an unconfirmed message full announcing pattern (b) has a first announcement state of a time interval of the unit time, a first announcement interruption state of the time interval of the unit time, a second announcement state of the time interval of the unit time, a second announcement interruption state of the time interval of the unit time, a third announcement state of the time interval of the unit time, and a third announcement interruption state of another time interval of three times the unit time. The first through the third announcement states and the first through the third announcement interruption states periodically appears in the unconfirmed message full announcing pattern at the period of eight times the unit time.

In FIG. 1, when the message memory 8 is filled with the unconfirmed messages except the protected messages as a consequence of reception of new messages, the radio paging receiver carries out, following the call announcement, the confirmed message full announcement having a clearly distinguishable announcing pattern. Accordingly, the possessor of the radio paging receiver can clearly recognize the confirmed message full announcement so that the received message is inhibited from being erased before it is confirmed.

Figure 4A:
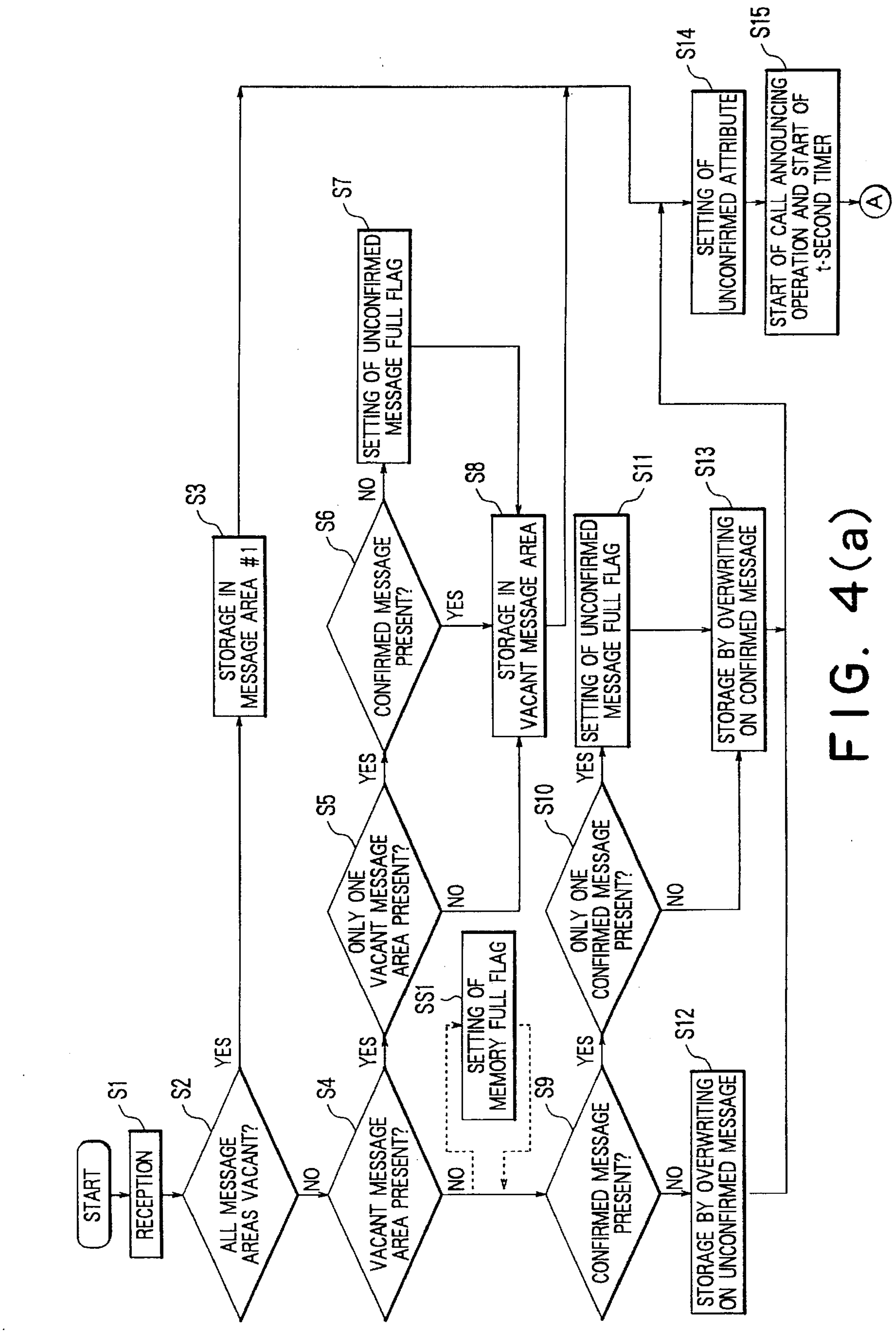
FIGS. 4(*a*) and 4(*b*) collectively show a flow chart for use in describing operation of the radio paging receiver illustrated in FIG. 1.
Figure 4B:
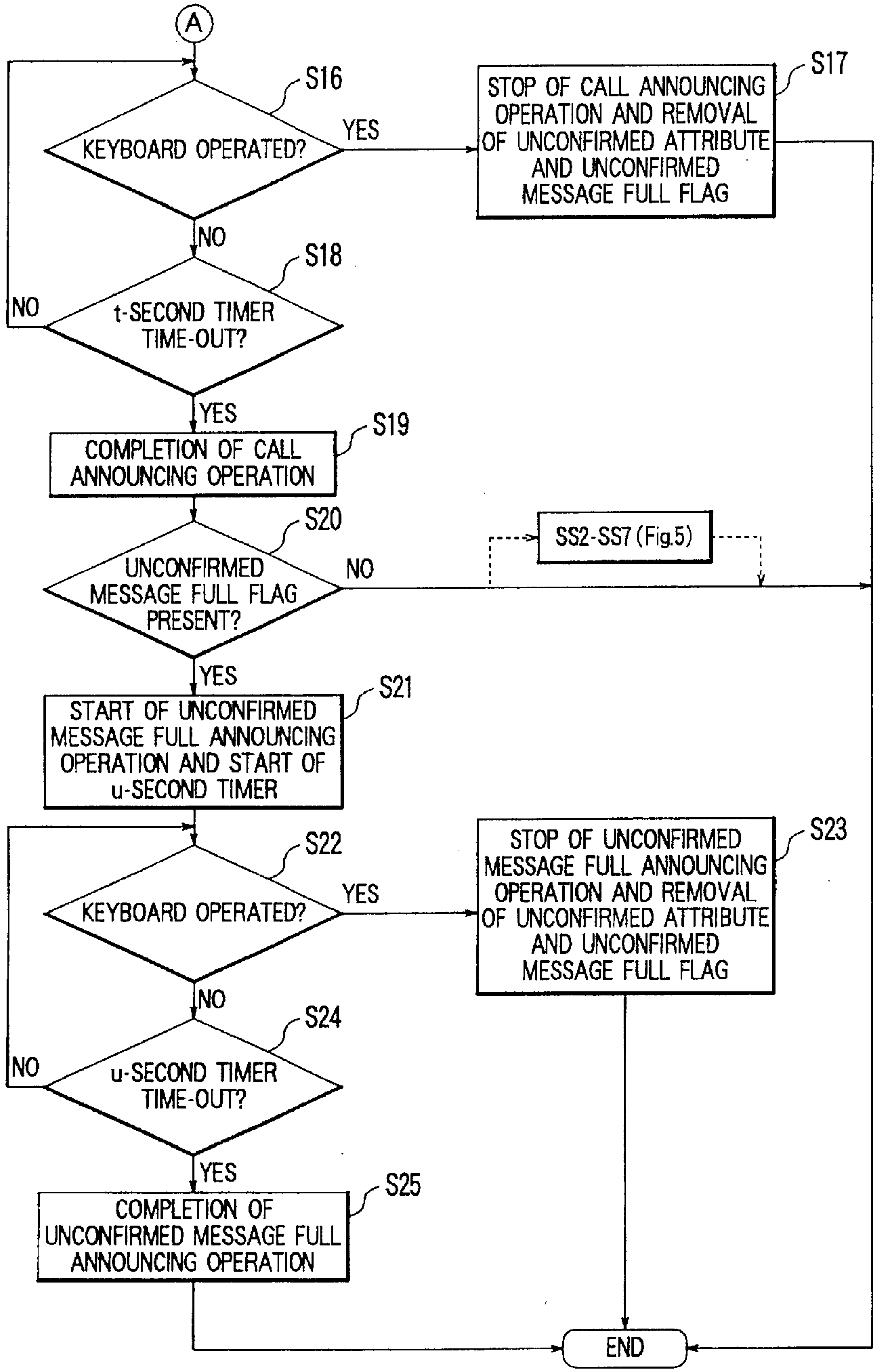

Turning to FIG. 4, operation of the radio paging receiver of FIG. 1 will be described more in detail.

When a message destined to the receiver is received as a received message (Step S1), the CPU 6 of the radio paging receiver detects, before storage of the reception message in the message memory 8, whether or not all message areas of the message memory 8 are vacant (or null) (Step S2). Detecting that all message areas of the message memory 8 are vacant (YES in Step S2), the CPU 6 makes the received message be stored in the message area having a memory number #1 (Step S3).

When it is detected in Step S2 that all message areas of the message memory 8 are not vacant (NO in Step S2), the CPU 6 then detects whether or not at least one vacant message area is present in the message memory 8 (Step S4). Upon detecting that at least one vacant message area is present in the message memory 8 (YES in Step S4), the CPU 6 then detects whether or not only one vacant message area is present in the message memory 8 (Step S5). Detecting that only one vacant area is present in the message memory 8 (YES in Step S5), the CPU 6 detects whether or not the confirmed message is present in the message memory 8 (Step S6). Detecting that no confirmed message is present in the message memory 8 (NO in Step S6), the CPU 6 sets the unconfirmed message full flag in the unconfirmed message full flag area 81 (FIG. 2) of the message memory 8 (Step S7). Thereafter, the CPU 6 stores the received message in the only one vacant area (Step S8). Likewise, detecting that the confirmed message is present in the message memory 8 (YES in Step S6), the CPU 6 stores the received message in the only one vacant area (Step S8). Detecting that only one vacant message area is not present (that is, a plurality of vacant message areas are present) in the message memory 8 (NO in Step S5), the CPU 6 searches for vacant message areas of the message memory 8 from a newest one in descending order of memory numbers and stores the received message in a first-found one of the vacant message areas (Step S8).

When it is detected in Step S4 that no vacant message area is present in the message memory 8 (NO in Step S4), the CPU 6 then detects whether or not any confirmed message or messages are present in the message memory 8 (Step S9). Detecting that at least one confirmed message is present in the message memory (YES in Step S9), the CPU 6 then detects whether or not only one confirmed message is left in the message memory 8 (Step S10). Detecting that only one confirmed message is left in the message memory 8 (YES in Step S10), the CPU 6 sets the unconfirmed message full flag in the unconfirmed message full flag area 81 of the message memory 8 (Step S11). Thereafter, the CPU 6 makes the confirmed message of the message memory 8 be overwritten by the received message (Step S13).

Likewise, detecting that a plurality of the confirmed messages are left in the message memory 8 (NO in Step S10), the CPU 6 makes one of the confirmed messages of the message memory 8 be overwritten by the received message (Step S13). More specifically, when it is detected in Step S10 that al least two confirmed messages are present among the messages stored in the message memory 8 (NO in Step S10), the CPU 6 searches for the message areas of the message memory 8 from the newest one in descending order of memory numbers. The received message is overwritten on a first-found one of the confirmed messages (Step S13). Herein, unprotected messages are searched by discriminating between presence and absence of the protected attribute which has been set in the message memory 8 during the protecting operation through the keyboard 10.

When it is detected in Step S9 that no confirmed message is present in the message areas of the message memory 8 (NO in Step S9), the CPU 6 searches for the message areas of the message memory 8 from the newest one in descending order of the memory numbers. The received message is overwritten on the first-found one of the unconfirmed messages which are unprotected (Step S12).

After the received message is stored in the message memory 8 at Steps S3, S8, S12, and S13, the CPU 6 sets the unconfirmed-attribute in the message area storing the received message (Step S14). The CPU 6 starts the call announcing operation and starts an internal timer (t-second timer) for measuring a time instant when the call announcing operation is completed (Step S15).

After Step S15, the CPU 6 detects whether or not a message confirming operation is carried out through the keyboard 10 during the call announcing operation (Step S16). In presence of the operation (YES in Step S16), the call announcing operation is stopped or interrupted and the unconfirmed attribute for the received message and the unconfirmed message full flag are removed from the message memory 8 (Step S17). In absence of the message confirming operation through the keyboard 10 during the call announcing operation in Step S16 (NO in Step S16), the CPU 6 detects whether or not the t-second timer is timed out (Step S18). When no time-out is detected (NO in Step S18), operation returns to Step S16. On the other hand, when the t-second timer is timed out (YES in Step S18), the CPU 6 stops the call announcing operation (Step S19).

After completion of the call announcement at Step S19, the CPU 6 detects whether or not the unconfirmed message full flag is present in the message memory 8 (Step S20). In presence, an unconfirmed message full announcing operation is started and an internal u-second timer for measuring a time instant when the unconfirmed message full announcing operation is completed (Step S21). The CPU 6 detects whether or not the message confirming operation is carried out through the keyboard 10 during the unconfirmed message full announcing operation (Step S22). In presence of the operation (YES in Step S22), the unconfirmed message full announcing operation is stopped or interrupted and the unconfirmed attribute for the received message and the unconfirmed message full flag are removed from the message memory 8 (Step S23).

Detecting that no message confirming operation is carried out through the keyboard 10 during the unconfirmed message full announcing operation in Step S21 (NO in Step S22), the CPU 6 then detects whether or not the u-second timer is timed out (Step S24). When no time-out is detected (NO in Step S24), the operation returns to Step S22. On the other hand, when the u-second timer is timed out (YES in Step S24), the CPU 6 makes the unconfirmed message full announcing operation be finished (Step S25). When Step S17, NO in Step S20, Step S23, and Step S25 are completed, the announcing operation of the radio paging receiver is completed.

In the above-mentioned radio paging receiver, a memory full flag may be set in a memory full flag area 82 (FIG. 2) of the message memory 8 at Step SS1 when it is detected that no vacant message area is present in the message memory 8 in Step S4 of the flow chart in FIG. 4 (NO in Step S4).

Figure 5:
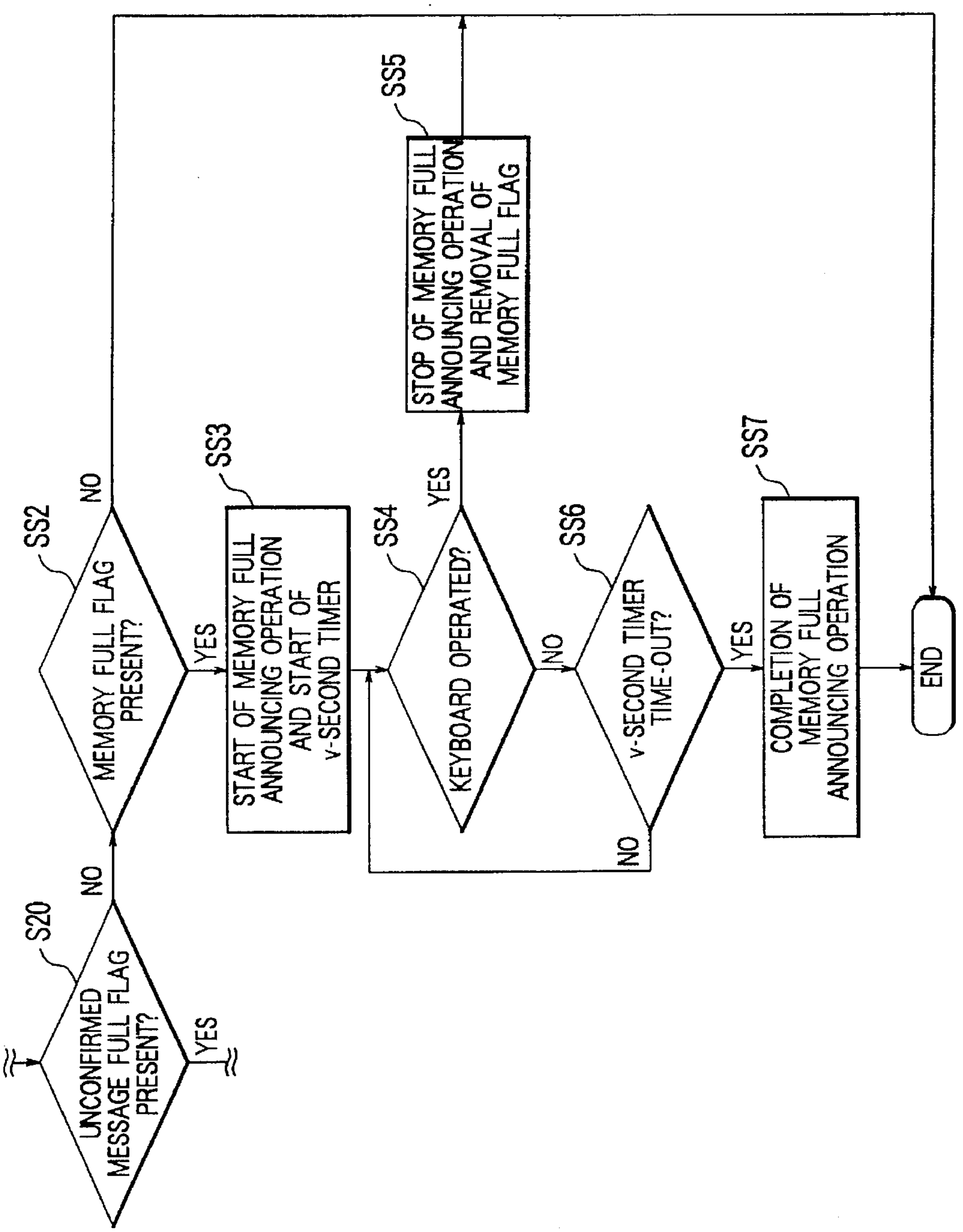
FIG. 5 is a flow chart for use in describing another operation of the radio paging receiver illustrated in FIG. 1.

In this event, the CPU 6 carries out a message full announcing operation in the manner illustrated in FIG. 5. In FIGS. 2 and 5, detecting that no unconfirmed message full flag is present at Step S20 (NO in Step 20), the CPU 6 detects whether or not the memory full flag is present in the memory full flag area 82 (FIG. 2) of the message memory 8 (Step SS2). In presence, the memory full announcing operation due to a memory full announcing pattern (c) of FIG. 3 is started and an internal v-second timer for measuring a time instant when the memory full announcing operation is completed (Step SS3). The CPU 6 detects whether or not the keyboard 10 is operated during the memory full announcing operation (Step SS4). When the keyboard 10 is operated (YES in Step SS4), the memory full announcing operation is stopped or interrupted and the memory full flag is removed from the message memory 8 (Step SS5).

When the keyboard 10 is not operated during the memory full announcing operation in Step SS3 (NO in Step SS4), the CPU 6 then detects whether or not the v-second timer is timed out (Step SS6). When no time-out is detected (NO in Step SS6), the operation returns to Step SS4. On the other hand, when the v-second timer is timed out (YES in Step SS6), the CPU 6 makes the memory full announcing operation be finished (Step SS7). When Step SS7, NO in Step SS2, and Step SS5 are completed, the memory full announcing operation of the radio paging receiver is completed.

Summarizing in FIGS. 1 and 4, a receiving section (1–6, 9, S1) receives a radio signal comprising a message and destined to the receiver and for producing the message as a received signal. A storing section (6, S3, S8, S12–S14) stores the received message in one of message areas of a message memory (8) as an unconfirmed message. An announcing section (11–18, S15) carries out a call announcement in response to the received message. An instruction producing section (10) produces an announcement stop instruction. Connected to the announcing section and the instruction producing section, a first detecting section (6, S16, S18) detects whether or not the announcing stop instruction is received within a predetermined time interval from a first time instant at which the announcing section begins to carry out the call announcement. Connected to the announcing section and the first detecting section, a first control section (6, S17) controls, when the first detecting section detects that the announcement stop instruction is received within the predetermined time interval, the announcing section and the message memory so that the announcing section stops the call announcement and that the message memory memorizes the received message in the above-mentioned one of the message areas as a confirmed message instead of the unconfirmed message.

Connected to the message memory and the first detecting section, a second detecting section (6, S20) detects that each of the message areas is filled with the unconfirmed message when the first detecting section does not detect that the announcing stop instruction is received within the predetermined time interval. Connected to the announcing section and the second detecting section, a second control section (6, S21) controls, when the second detecting section detects that each of the message areas is filled with the unconfirmed message, the announcing section to make the announcing section announce an unconfirmed message full announcement instead of the call announcement. The unconfirmed message full announcement has a different announcing pattern which is different from that of the call announcement.

Connected to the announcing section and the instruction producing section, a third detecting section (6, S22, S24) detects whether or not the announcement stop instruction is received within a preselected time interval from a second time instant at which the announcing section begins to announce the unconfirmed message full announcement instead of the call announcement. Connected to the announcing section and the third detecting section, a third control section (6, S23, S25) controls, when the third detecting section detects that the announcement stop instruction is received within the preselected time interval, the announcing section so that the announcing section stops the unconfirmed message full announcement and that the message memory memorizes the received message in the above-mentioned one of the message areas as the confirmed message instead of the unconfirmed message. When the third detecting section does not detect that the announcing stop instruction is received within the preselected time interval, the third control section controls the announcing section so that the announcing section stops the unconfirmed message full announcement.

The above-mentioned one of the message areas is selected from the message areas except unconfirmed message areas in which other unconfirmed messages are stored.

It will be supposed that the message memory has, among the message areas, a protected message area in which another confirmed message is stored as a protected message which is protected from overwriting thereon. In this case, the second detecting section detects that the message areas are filled with the unconfirmed message except the protected message when the first detecting section does not detect the announcing stop instruction is received within the predetermined time interval. When the second detecting section detects that the message areas are filled with the unconfirmed message except the protected message, the second control section controls the announcing section to make the announcing section announce the unconfirmed message full announcement instead of the call announcement. In this case, the above-mentioned one of the message areas is selected from the message areas except the protected message area and the unconfirmed message areas.

What is claimed is:

1. A radio paging receiver comprising:

receiving means for receiving a radio signal comprising a message destined to said receiver and for producing said message as a received message;

a message memory having a plurality of message areas;

storing means for storing said received message in one of said message areas as an unconfirmed message;

announcing means for carrying out a call announcement in response to said received message to announce reception of said received message;

instruction producing means for producing an announcement stop instruction;

first detecting means connected to said announcing means and said instruction producing means for detecting whether or not said announcement stop instruction is received within a predetermined time interval from a first time instant at which said announcing means begins to carry out said call announcement;

first control means connected to said announcing means and said first detecting means for controlling, when said first detecting means detects that said announcement stop instruction is received within said predetermined time interval, said announcing means and said message memory so that said announcing means stops said call announcement and that said message memory memorizes said received message in said one of the message areas as a confirmed message instead of said unconfirmed message;

second detecting means connected to said message memory and said first detecting means for detecting that each of said message areas is filled with said unconfirmed message when said first detecting means does not detect that said announcing stop instruction is received within said predetermined time interval; and second control means connected to said announcing means and said second detecting means for controlling, when said second detecting means detects that each of said message areas is filled with said unconfirmed message, said announcing means to make said announcing means announce an unconfirmed message full announcement instead of said call announcement, said unconfirmed message full announcement having an announcing pattern which is different from that of said call announcement.

2. A radio paging receiver as claimed in claim 1, further comprising:

third detecting means connected to said announcing means and said instruction producing means for detecting whether or not said announcement stop instruction is received within a preselected time interval from a second time instant at which said announcing means begins to announce said unconfirmed message full announcement instead of said call announcement; and third control means connected to said announcing means and said third detecting means for controlling, when said third detecting means detects that said announcement stop instruction is received within said preselected time interval, said announcing means so that said announcing means stops said unconfirmed message full announcement and that said message memory memorizes said received message in said one of the message areas as said confirmed message instead of said unconfirmed message, said third control means controlling, when said third detecting means does not detect that said announcing stop instruction is received within said preselected time interval, said announcing means so that said announcing means stops said unconfirmed message full announcement.

3. A radio paging receiver as claimed in claim 1, wherein said announcing means is a loudspeaker.

4. A radio paging receiver as claimed in claim 1, wherein said announcing means is a light emitting diode.

5. A radio paging receiver as claimed in claim 1, wherein said announcing means is a vibrator.

6. A radio paging receiver as claimed in claim 1, wherein said announcing means is a liquid crystal display panel.

7. A radio page receiver as claimed in claim 1, wherein said storing means stores the recorded message in one of the message areas other than the unconfirmed message areas in which other unconfirmed messages are stored.

8. A radio paging receiver as claimed in claim 1, said message memory having, among said message areas, a protected message area in which another confirmed message is stored as a protected message which is protected from overwriting thereon, wherein:

said second detecting means detects that said message areas are filled with said unconfirmed message except said protected message when said first detecting means does not detect said announcing stop instruction is received within said predetermined time interval;

said second control means controlling, when said second detecting means detects that said message areas are filled with said unconfirmed message except said protected message, said announcing means to make said announcing means announce said unconfirmed message full announcement instead of said call announcement.

9. A radio paging receiver as claimed in claim 8, further comprising:

third detecting means connected to said announcing means and said instruction producing means for detecting whether or not said announcement stop instruction is received within a preselected time interval from a second time instant at which said announcing means begins to announce said unconfirmed message full announcement instead of said call announcement; and third control means connected to said announcing means and said third detecting means for controlling, when said third detecting means detects that said announcement stop instruction is received within said preselected time interval, said announcing means so that said announcing means stops said unconfirmed message full announcement and that said message memory memorize said received message in said one of the message areas as said confirmed message instead of said unconfirmed message, said third control means controlling, when said third detecting means does not detect that said announcing stop instruction is received within said preselected time interval, said announcing means so that said announcing means stops said unconfirmed message full announcement.

10. A radio paging receiving as claimed in claim 8, wherein said storing means stores the received message in one of the message areas other than the protected message areas and unconfirmed message areas in which other unconfirmed messages are stored.

* * * * *